F. G. McPHERSON.
MEANS FOR LIGHTING AUDITORIUMS AND OTHER PLACES.
APPLICATION FILED FEB. 20, 1915.
1,196,795.
Patented Sept. 5, 1916.
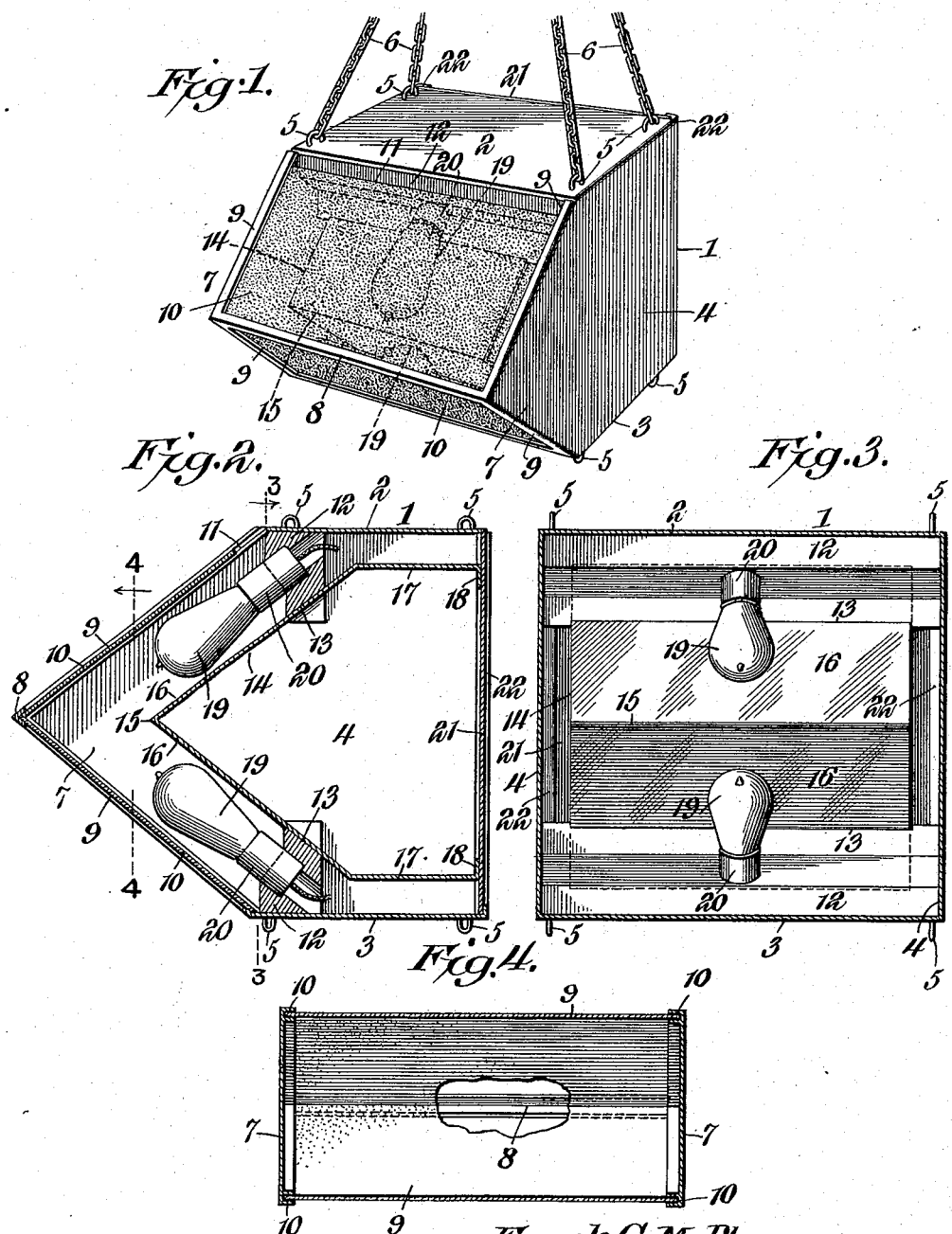
WITNESSES
Howard D. Orr.
H. P. Chapman.
Frank G. McPherson, INVENTOR,
BY E. G. Siggers
ATTORNEY

UNITED STATES PATENT OFFICE.

FRANK G. McPHERSON, OF BEAVER FALLS, PENNSYLVANIA, ASSIGNOR TO SHADO-LITE MFG. CO., INC., OF BEAVER FALLS, PENNSYLVANIA, A CORPORATION OF DELAWARE.

MEANS FOR LIGHTING AUDITORIUMS AND OTHER PLACES.

1,196,795.      Specification of Letters Patent.      Patented Sept. 5, 1916.

Application filed February 20, 1915. Serial No. 9,651.

*To all whom it may concern:*

Be it known that I, FRANK G. McPHERSON, a citizen of the United States, residing at Beaver Falls, in the county of Beaver and State of Pennsylvania, have invented a new and useful Means for Lighting Auditoriums and other Places, of which the following is a specification.

This invention has reference to means for lighting auditoriums, etc., and its object is to provide a lighting means which even if located in front of and directed toward the audience will provide sufficient light for various purposes without obtrusive glare.

It is a common practice in auditoriums where the attention of the audience is directed to some scene or view to accentuate such scene or view by darkening the body of the auditorium and brilliantly illuminating that which the audience is to see. In the case of ordinary theaters the stage is usually illuminated during the progress of a scene and the body of the auditorium is left without any light except such as may come from the stage. In motion picture auditoriums the conditions demand the lighting of the auditorium, but this is usually done in a manner making the body of the auditorium dim. Even then the light in the auditorium, though dim, has a material effect upon the screen, illuminating the latter to an extent requiring a much more intense light in the projection apparatus than would be the case were the body of the auditorium without any illumination.

While an illuminating scheme which has no marked detrimental effect upon the illumination of the stage is of value in ordinary theaters, such scheme when providing ample illumination for the auditorium of a motion picture theater without detrimental effect upon the screen, is of far greater value, since the audience is constantly changing, and it is particularly difficult for persons entering the theater from a brilliantly lighted exterior to find their way to seats before the eyes become accustomed to the dim illumination usually provided. Moreover, the poor illumination usual to motion picture theaters is encouraging to those criminally or mischievously inclined.

The present invention comprises an illuminating means which may be located adjacent to the stage platform or to the screen in accordance with the type of theater, and while the sources of light employed may be visible to the audience, the direction of emanation of the light rays from the illuminating means is such that the eyes of the audience are not subjected to any strong light although the light is directed into the auditorium and away from the stage or screen.

By the use of diffusive means and directing of propagation of the light rays in such way that reflections are away from the stage or screen, the latter is thrown into a shadow which permits of ample illumination of either the stage or screen with less intensity of light than would otherwise be needed.

The present invention contemplates the use of a box or closure with windows of milk or opalescent glass or of ground glass or some other light diffusive form of glass, with sources of light behind them, which sources of light are usually incandescent electric lamps with reflectors associated with the lamps in a manner to cause the reflected light to pass through the windows in directions out of line with the eyes of the audience, while the body of the box forms an opaque shield between the sources of light and the stage or screen, thereby throwing the latter in a shadow.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is a perspective view of a light-giving means constructed in accordance with the present invention. Fig. 2 is a front to rear vertical section of the structure of Fig. 1. Fig. 3 is a front elevation of the structure of Fig. 1 with the casing in section on the line 3—3 of Fig. 2. Fig. 4 is a section on the line 4—4 of Fig. 2, with a portion of the windows broken away to display a more distant part.

Referring to the drawings there is shown a box or casing 1 which in the main may be of general rectangular shape, and this box has a top 2, bottom 3 and sides 4. The top and bottom of the box may be of approximately the same area and the box is provided with eyes 5 near the corners for the attachment of suspension chains 6 which may be connected to a suitable suspension canopy such as is customarily employed in the so-called electric chain fixtures. The sides 4 of the box have triangular prolongations 7 toward the top 2 and bottom 3 with the apexes of the prolongations connected by a strip 8 which may be of channel form, thereby defining two openings at what may be termed the front of the box with these openings inclined with relation one to the other toward a mid line represented by the strip 8. The inclined margins of the prolongations 7 are formed with channels 9 for the reception of the edges of glass panes 10 which when inserted in the channels have the same relation one to the other as the margins of the prolongations. The strip 8 is located about midway of the height of the box when the latter is in operative suspended position and the glass panes 10 constituting windows extend from the strip 8 toward the top 2 and bottom 3 of the box. The upper glass pane inclines from the strip 8 toward the top of the box and the lower glass pane declines from the strip 8 toward the bottom of the box. For ventilating purposes the glass pane 10 may stop short of the top of the box, thereby leaving a ventilating channel 11 extending crosswise of the box adjacent to the forward edge of the top 2.

Within the box and close to the front edges of the top and bottom are strips 12 each having the edge remote from that adjacent to the respective top and bottom of the box inclined or beveled as shown at 13, the bevel surfaces diverging toward the back of the box. The strips 12 are made fast to the box and the beveled surfaces may be of less length than that of the strips, so as to stop short of the sides of the box. Fitted to the bevels 13 which constitute channels is a sheet 14 of metal bent at a point intermediate of its length as indicated at 15 into two divergent portions 16 adapted to seat in the bevel channels 13 with the portions 16 substantially parallel with, but spaced from the glass panes 10. From the separated edges of the divergent portions 16 the plate 14 has substantially parallel continuations 17 extending to the rear of the box 1 and there bent into approaching flanges 18, or instead of the flanges, beads may be provided, or the flanges or beads may be entirely omitted. Such flanges or beads are, however, advantageous in stiffening the structure. The plate 14 bent as described constitutes a reflecting member, and lodged in the spaces between the reflectors 16 and the glass panes 10 are electric lamps 19 which may be incandescent electric lamps, while the blocks or strips 12 carry sockets 20 for said lamps. Ordinarily but two lamps are needed one behind each glass pane 10 and in front of a respective reflector 16. The reflector plate 14 requires no fastening devices since it is quite well centered by the beveled channels 13 in the strips 12, and is held from escape from the box by a slide back 21 traveling in channels 22 in the back of the sides 4 of the box and supported by the bottom 3, which is made long enough for the purpose.

Since the box is practically a closed box, ventilation is provided by the channel 11 and the spaces between the sides of the plate 14 and the sides of the box 1, as the channels 13 do not extend quite to the ends of the strips or blocks 12.

When the box 1 is installed it is properly hung so that the strip 8 is toward the audience at a height that will not detract from the stage or screen, the boxes, of which there may be two or more, being located at the sides of the stage or screen out of a line of direct vision of the audience. The slanting of the windows 10 and the reflectors 16 is such that the angle of reflection does not reach the eyes of the audience, nor will the light-giving elements 19 be distractively visible to the audience. This lack of obtrusiveness is furthered by having the windows 10 of opal or milk glass, or even of ground glass, since such glass eliminates all glare spots, while no portions of the reflector liable to produce glare are so related to the eyes of the audience as to be seen.

The lighting means described produces a soft and well diffused light sufficiently illuminating an auditorium, and especially a motion picture auditorium to provide light enough to enable persons entering the auditorium from a brilliantly lighted exterior to see sufficiently to find seats without experiencing the temporary blindness so commonly observed when entering dimly lighted auditoriums from a brilliant exterior. Moreover, the light emitting portions of the illuminating means being shielded from the screen by the opaque walls of the box produce no such illumination of the screen as to require additional intensity of light at the projecting apparatus, while the presence of the light giving units in diffusing the light away from the screen actually intensifies the shadow on the screen and permits the showing of the picture satisfactorily with less illumination at the projecting apparatus than has heretofore been found to be needful.

In the foregoing description emphasis has been made upon the advantages of the present invention in motion picture theaters, but the same advantages although perhaps not so pronounced are present when the illuminating means described are employed in ordinary theaters provided with stages.

The lighting unit may be so mounted, or may be suspended by chains 6 connected to any suitable ones of the eyes 5, so as to project the light forwardly, rearwardly, sidewise, up or down, or at any angle to any of the directions stated.

The lighting means herein shown and described may be used in a great many places other than motion picture and other theaters, as, for instance, in bowling alleys, factories, and in fact wherever it may be found to be useful, and the word auditorium as used in the claims is to be understood as including any place where the lighting unit may be used.

What is claimed is:—

1. A means for illuminating auditoriums, comprising a box of opaque material with oppositely disposed windows at one end, said windows being formed of light-diffusive, light-transmitting material and converging to a line of meeting intermediate of the height of the box and extending transversely thereof, oppositely-disposed substantially plane reflectors housed within the box and converging to a line of meeting back of and substantially parallel with the first-named line of meeting, and light-giving elements within the box between each window and the reflector back thereof and individual to said window.

2. A means for illuminating auditoriums, comprising a box of opaque material having converging walls at one end formed of plane light-diffusive glass plates meeting on a line transverse to the box and about midway of the height thereof, a light-giving element lodged behind each glass wall and individual thereto, and plane reflectors within the box one back of each light-giving element, the reflectors meeting on the line back of and substantially parallel to the line of meeting of the glass walls.

3. A means for illuminating auditoriums comprising a box having converging windows of light-diffusive glass at one end, cross strips within the box carrying electric lamp sockets to support electric lamps behind the windows, and each strip having a bevel channel in matching relation to that of the other, a reflecting member having converging reflecting surfaces adapted to the bevel channels, and a continuation toward the back of the box, and a slide at the back of the box in position to engage the reflecting member to hold it in the channels with the reflectors in substantially parallelism with the glass windows.

4. A means for illuminating auditoriums, comprising a box of opaque material having convergent glass windows at one end, interior convergent reflectors in substantially parallel spaced relation to the glass windows and stopping short of the sides of the box, supports for incandescent electric lamps having channels for receiving and holding the converging reflectors, and means for temporarily holding the reflectors in the box, one edge of one of the glass windows stopping short of the corresponding edge of the box to provide a ventilating opening.

5. A means for illuminating auditoriums comprising a box of opaque material having convergent plane windows of light diffusive glass at one end meeting on a line transverse of the said end of the box, convergent plane reflectors within the box in spaced relation to and back of and individual to the windows in substantially parallel relation thereto, means for supporting incandescent electric lamps in the spaces between the reflectors and windows and individual to the respective windows, and sustaining means connected to the box to support said box so that the line of junction of the windows and reflectors is substantially in the plane of observation, and the windows, reflectors and lamps are on opposite sides of said plane.

In testimony that I claim the foregoing as my own, I have hereto affixed my signature in the presence of two witnesses.

FRANK G. McPHERSON.

Witnesses:
DANIEL C. TIMMONS,
V. SAKRAIDA.